United States Patent
Kumano

(10) Patent No.: US 12,549,035 B2
(45) Date of Patent: Feb. 10, 2026

(54) CONTACTLESS POWER FEEDING APPARATUS AND CONTACTLESS POWER FEEDING METHOD

(71) Applicant: MURATA MACHINERY, LTD., Kyoto (JP)

(72) Inventor: Toshiya Kumano, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 18/712,369

(22) PCT Filed: Sep. 2, 2022

(86) PCT No.: PCT/JP2022/033145
§ 371 (c)(1),
(2) Date: May 22, 2024

(87) PCT Pub. No.: WO2023/100430
PCT Pub. Date: Jun. 8, 2023

(65) Prior Publication Data
US 2025/0015640 A1 Jan. 9, 2025

(30) Foreign Application Priority Data
Nov. 30, 2021 (JP) ................. 2021-194130

(51) Int. Cl.
*H02J 50/40* (2016.01)
*B60L 53/122* (2019.01)
*H02J 50/12* (2016.01)

(52) U.S. Cl.
CPC ............ *H02J 50/40* (2016.02); *B60L 53/122* (2019.02); *H02J 50/12* (2016.02)

(58) Field of Classification Search
CPC .. H02J 50/40; H02J 50/12; H02J 50/10; H02J 50/80; H02J 50/90; B60L 53/122; B60L 5/00; H02M 7/48; B60M 7/00; H04L 7/00
See application file for complete search history.

(56) References Cited

U.S. PATENT DOCUMENTS

| | | | |
|---|---|---|---|
| 9,712,040 B1 * | 7/2017 | Kim | H02M 1/12 |
| 10,998,833 B2 * | 5/2021 | Llic | H02M 7/48 |
| 11,316,422 B1 * | 4/2022 | Lin | H02M 7/44 |
| 12,206,239 B2 * | 1/2025 | Makitani | H03K 17/691 |

(Continued)

FOREIGN PATENT DOCUMENTS

| | | |
|---|---|---|
| KR | 10-1017407 B1 | 2/2011 |
| WO | 2013/145573 A1 | 10/2013 |
| WO | 2022/074974 A1 | 4/2022 |

OTHER PUBLICATIONS

Official Communication issued in International Patent Application No. PCT/JP2022/033145, mailed on Nov. 8, 2022.

(Continued)

*Primary Examiner* — Daniel Kessie
*Assistant Examiner* — Brian K Baxter
(74) *Attorney, Agent, or Firm* — Keating & Bennett, LLP

(57) ABSTRACT

A contactless power feeding system includes power supply lines to supply power in a contactless manner to a power receiver on a mobile body, power supply boards to generate power, and a power distribution circuit to distribute and supply the power generated by the power supply boards to the power supply lines.

8 Claims, 10 Drawing Sheets

(56) References Cited

U.S. PATENT DOCUMENTS

| | | | | |
|---|---|---|---|---|
| 2003/0075984 A1* | 4/2003 | Ho | ................ | G06F 1/189 |
| | | | | 307/43 |
| 2005/0127066 A1* | 6/2005 | Youm | ................ | H02J 50/10 |
| | | | | 219/660 |
| 2007/0085420 A1* | 4/2007 | Hartung | ................ | H02J 1/001 |
| | | | | 307/24 |
| 2008/0121481 A1* | 5/2008 | Mitsuhashi | ................ | H02J 50/10 |
| | | | | 191/10 |
| 2011/0101792 A1* | 5/2011 | Koumoto | ................ | H02J 50/70 |
| | | | | 307/104 |
| 2014/0252870 A1* | 9/2014 | Covic | ................ | H01F 38/14 |
| | | | | 307/104 |
| 2015/0015072 A1* | 1/2015 | Deboy | ................ | H02M 7/537 |
| | | | | 307/52 |
| 2017/0126008 A1* | 5/2017 | Shen | ................ | H02J 3/36 |
| 2017/0207656 A1* | 7/2017 | Boys | ................ | H02J 50/40 |
| 2018/0131219 A1* | 5/2018 | Kim | ................ | H02J 50/10 |
| 2020/0014214 A1* | 1/2020 | Nishimoto | ................ | H02J 4/00 |
| 2020/0091836 A1* | 3/2020 | Lee | ................ | H02M 7/4826 |
| 2021/0076817 A1* | 3/2021 | Mizutani | ................ | A47B 49/004 |
| 2021/0138911 A1* | 5/2021 | Mizutani | ................ | H01L 21/67733 |
| 2023/0168127 A1* | 6/2023 | Nishioka | ................ | H04Q 9/00 |
| | | | | 340/584 |
| 2023/0211670 A1* | 7/2023 | Tomita | ................ | B60L 5/38 |
| | | | | 191/10 |
| 2023/0365027 A1* | 11/2023 | Tomita | ................ | H02J 50/005 |
| 2024/0017752 A1* | 1/2024 | Shimomura | ................ | B60M 7/00 |
| 2024/0128769 A1* | 4/2024 | Tomita | ................ | H02J 50/12 |
| 2024/0128800 A1* | 4/2024 | Nunoya | ................ | B60L 5/005 |
| 2024/0140213 A1* | 5/2024 | Cho | ................ | B60L 53/122 |

OTHER PUBLICATIONS

Official Communication issued in International Patent Application No. PCT/JP2022/033145, mailed on Jun. 13, 2024, 2 pages.

English Translation of Official Communication issued in International Patent Application No. PCT/JP2022/033145, mailed on Nov. 8, 2022, 4 pages.

\* cited by examiner

CONTACTLESS POWER FEEDING APPARATUS AND CONTACTLESS POWER FEEDING METHOD

BACKGROUND OF THE INVENTION

1. Field of the Invention

The present disclosure relates to contactless power feeding apparatuses and contactless power feeding methods.

2. Description of the Related Art

For example, as a conventional contactless power feeding system, a system described in WO2013/145573 is known. The contactless power feeding n described in WO2013/145573 includes a power supply line and a power feeding apparatus configured to supply power to the power supply line from a power feeding point. In such a configuration, a mobile body such as a transport cart can receive power from the power supply line in a contactless manner.

SUMMARY OF THE INVENTION

In the conventional contactless power feeding system described above, when power supply from the power feeding apparatus is stopped due to a failure or the like, it is impossible to prevent power supply to a mobile body from the power supply line connected to the power feeding apparatus.

Example embodiments of the present invention provide contactless power feeding apparatuses and contactless power feeding methods each capable of stably supplying power to a mobile body.

A contactless power feeding apparatus according to an example embodiment of the present disclosure includes a plurality of power supply lines to supply power in a contactless manner to a power receiver provided on a mobile body, a plurality of power supply boards to generate power, and a power distribution circuit to distribute and supply the power generated by the power supply boards to the power supply lines.

According to the above example embodiment, the power generated by each of the power supply boards is distributed and supplied to the power supply lines. Hence, it is possible to supply power to a mobile body from the power supply lines in a contactless manner. Consequently, even if the power supply from one of the power supply boards is stopped due to a failure or the like, it is possible to supply power via the power supply lines to the mobile body from the remaining power supply boards other than the one of the power supply boards. Hence, it is possible to stably supply power to the mobile body.

Alternatively, a contactless power feeding method according to another example embodiment of the present disclosure distributes and supplies power generated by a plurality of power supply boards to a plurality of power supply lines via a power distribution circuit, and supplies the power to a power receiver provided on a mobile body from the power supply lines in a contactless manner. Based on a clock signal generated therein, one power supply board set to a first operation mode that is one of the power supply boards, generates AC power by driving an inverter circuit of the one power supply board, and transmits the clock signal as a standard signal to remaining power supply boards other than the one power supply board among the power supply boards, and, based on a clock signal generated therein and the standard signal received from the one power supply board, the remaining power supply boards generate AC power by driving the inverter circuit such that a phase of the AC power output from the one power supply board matches a phase of the AC power output from the remaining power supply boards.

According to the other example embodiment described above, in the one power supply board set to the first operation mode in advance, AC power is generated on the basis of the clock signal of the one power supply board, and in the remaining power supply boards set to a second operation mode in advance, AC power the phase of which matches that of the AC power generated by the one power supply board is generated on the basis of the clock signal of the remaining power supply board and the clock signal in the one power supply board. Consequently, it is possible to align the phases of the AC power supplied to the power supply lines from the power supply boards, and stably supply power to the mobile body. In addition, by performing synchronous control on the basis of a clock signal to control the inverter circuit, there is no need to take variation factors into account. Hence, it is possible to more stably supply power.

According to example embodiments of the present disclosure, it is possible to stably supply power to a mobile body.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
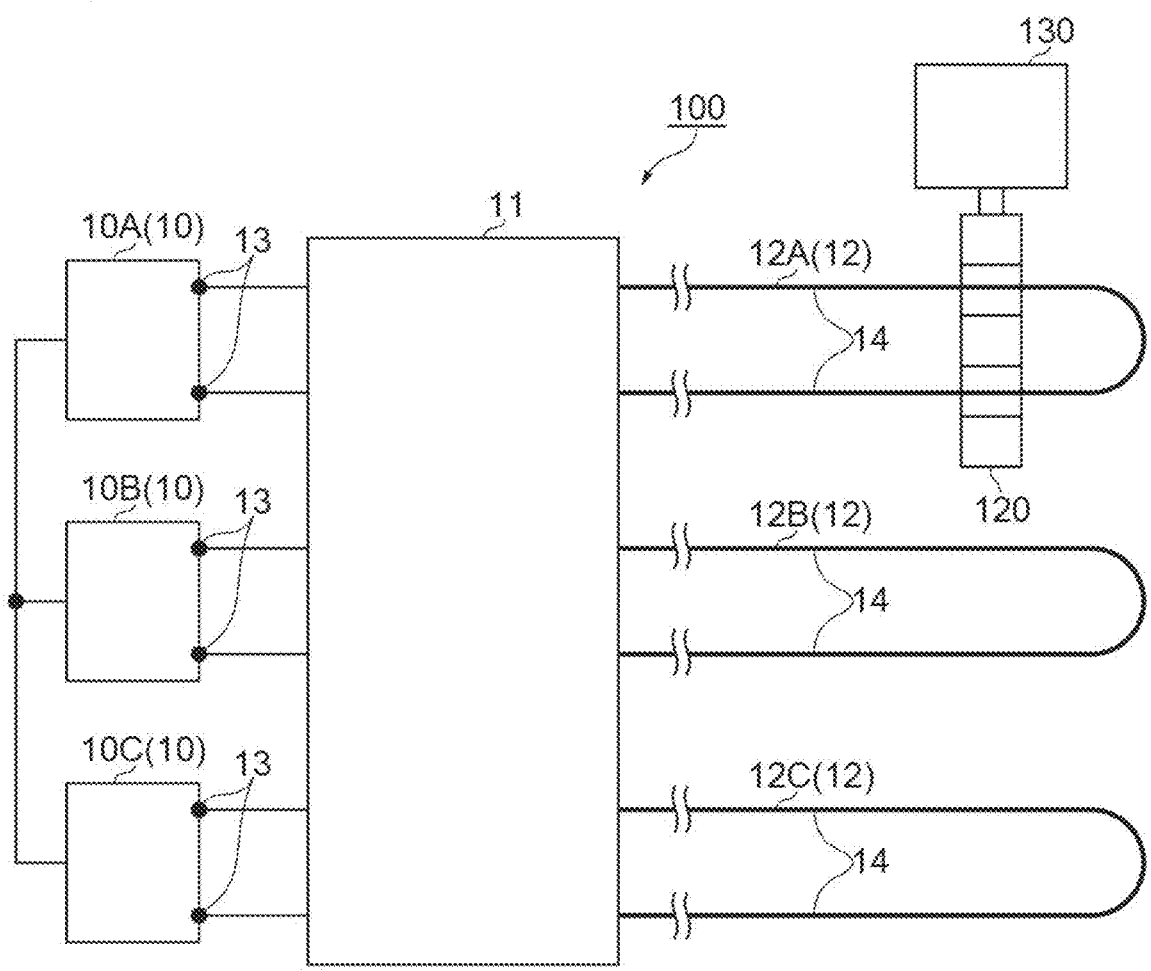
FIG. 1 is a diagram illustrating a configuration of a contactless power feeding system according to an example embodiment of the present disclosure.

Hereinafter, example embodiments of the present disclosure will be described with reference to the accompanying drawings. In the description of the drawings, the same reference numerals denote the same components, and overlapping descriptions will be omitted.

FIG. 1 is a circuit diagram illustrating a configuration of a contactless power feeding system 100 serving as a contactless power feeding apparatus according to an example embodiment of the present disclosure. As illustrated in FIG. 1, the contactless power feeding system 100 in the present example embodiment is a power feeding system configured to supply power in a contactless manner to a mobile body 130 including a power receiver 120. An example of the mobile body 130 to which power is supplied by the contactless power feeding system 100 includes a tracked transport vehicle with a built-in motor that travels on a track such as rails by driving the motor with power received via the power receiver 120 such as a power receiving coil. The contactless power feeding system 100 of the present example embodiment includes a plurality of power supply boards 10, a power distribution circuit 11, and a plurality of power supply lines 12. In the present example embodiment, a configuration including three power supply boards 10A, 10B, and 10C, and three power supply lines 12A, 12B, and 12C are illustrated. However, the number of the power supply boards 10 and the number of power supply lines 12 are not limited to a specific number as long as the number is two or more. The power distribution circuit 11 may be provided outside the power supply boards 10 as a separate device, or may be built into any power supply board 10.

Each of the power supply boards 10A, 10B, and 10C is a device configured to generate AC power by receiving a supply of constant voltage (DC voltage) from a DC power source, and has a pair of output terminals 13 configured to output AC power. The pair of output terminals 13 of the power supply boards 10A, 10B, and 10C are electrically connected to the power distribution circuit 11.

The power distribution circuit 11 is a circuit configured to distribute AC power generated by the three power supply boards 10A, 10B, and 10C each to the three power supply lines 12A, 12B, and 12C, and combine and supply the distributed AC power to each of the three power supply lines 12A, 12B, and 12C. The power distribution circuit 11 includes a circuit unit configured to distribute and combine the AC power, and a resonance circuit configured to cause the AC power to resonate and be output (details will be described later).

The power supply lines 12A, 12B, and 12C are transmission lines provided along a track (not illustrated) where the mobile body 130 can travel. That is, the power supply lines 12A, 12B, and 12C are arranged in parallel or substantially in parallel in a state of being electrically insulated from each other on the track, which is not illustrated. The power supply lines 12A, 12B, and 12C each include a pair of transmission lines 14 extending in parallel, and ends of the pair of transmission lines 14 are electrically connected to the power distribution circuit 11. These power supply lines 12A, 12B, and 12C supply the AC power output from the power distribution circuit 11, to the mobile body 130 via the power receiver 120 located in the vicinity of the pair of transmission lines 14. Specifically, the power receiver 120 including an E-shaped core is attached to the mobile body 130, and the pair of transmission lines 14 are disposed in a gap of the E-shaped core of the power receiver 120.

Figure 2:
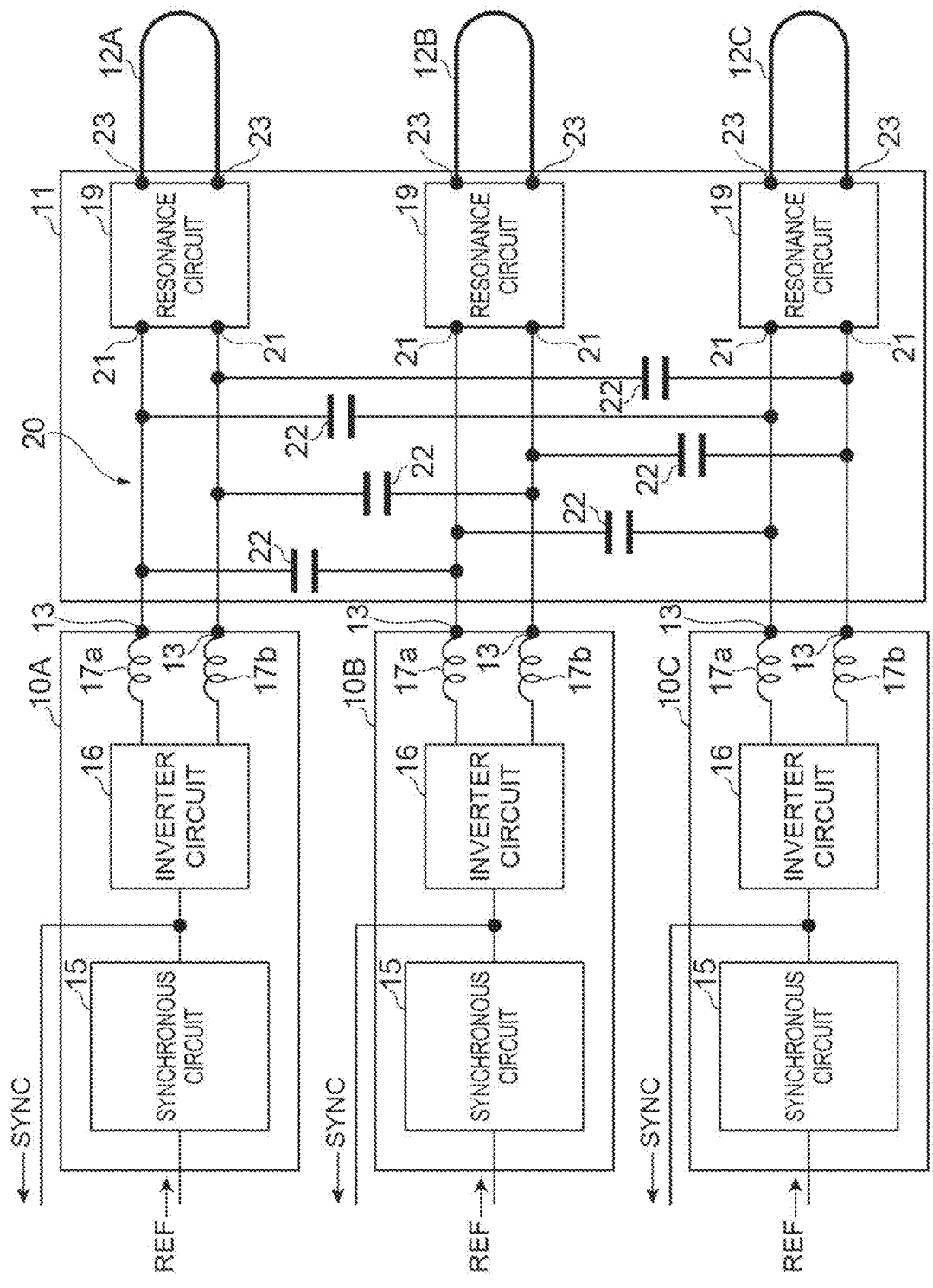
FIG. 2 is a diagram illustrating a detailed configuration of the contactless power feeding system in FIG. 1.
Figure 3:
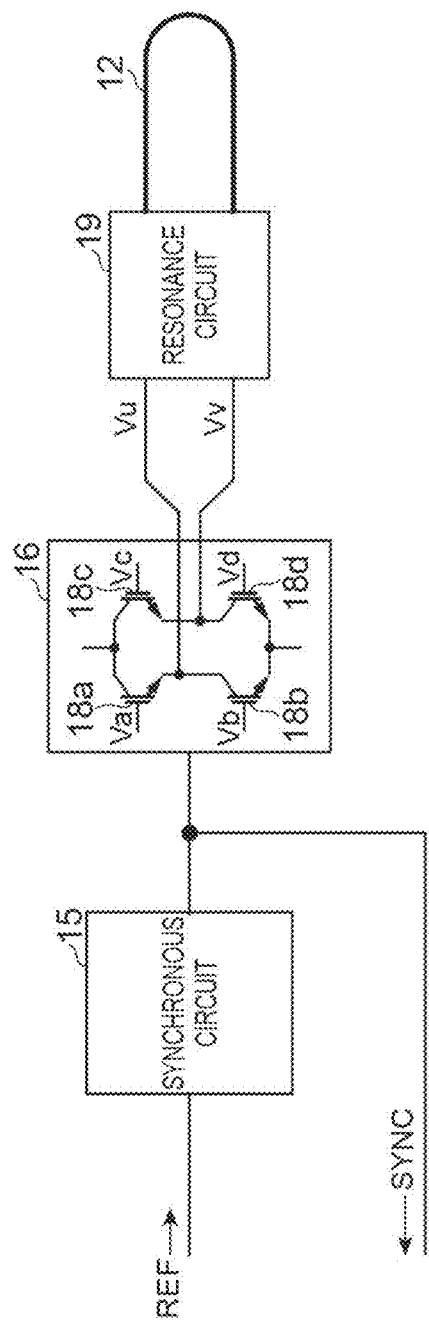
FIG. 3 is a diagram illustrating a detailed configuration of an inverter circuit in FIG. 2 and the connection configuration.

Next, with reference to FIG. 2 and FIG. 3, a detailed configuration of the contactless power feeding system 100 will be described. FIG. 2 is a diagram illustrating a detailed configuration of the contactless power feeding system 100 in FIG. 1. FIG. 3 is a diagram illustrating a detailed configuration of an inverter circuit in FIG. 2 and the connection configuration.

Each of the power supply boards 10A, 10B, and 10C includes a synchronous circuit 15, an inverter circuit 16, and a pair of inductor elements 17a and 17b.

The inverter circuit 16 is a circuit configured to convert a constant voltage into AC voltage, and is composed of an H-bridge circuit including an Insulated Gate Bipolar Transistor (IGBT). That is, the inverter circuit 16 includes four IGBTs 18a, 18b, 18c, and 18d. A positive voltage, that is, a constant voltage, is applied to the collectors of the IGBTs 18a and 18c, and a negative voltage, that is, a constant voltage, is applied to the emitters of the IGBTs 18b and 18d. Each of the emitters of the IGBTs 18a and 18c is electrically connected to the collectors of the IGBTs 18b and 18d. The inverter circuit 16 is operated to generate an AC voltage between the two emitters of the IGBTs 18a and 18c of a pair of output terminals when a clock signal is applied to the base of each of the IGBTs 18a, 18b, 18c, and 18d. Ends of the pair of inductor elements 17a and 17b are connected to the pair of output terminals of the inverter circuit 16, and the other ends define the pair of output terminals 13 of the power supply boards 10A, 10B, and 10C.

The synchronous circuit 15 is a circuit configured to generate four clock signals to control the operation of the inverter circuit 16. The synchronous circuit 15 is configured so as to be able to set the generation operation of the clock signal into two types of a first operation and a second operation. Upon being set to the first operation, the synchronous circuit 15 generates the standard signal SYNC, that is, a clock signal obtained by frequency-dividing the operation clock generated by a built-in crystal oscillator. Then, on the basis of the generated standard signal SYNC, the synchronous circuit 15 generates control signals (clock signals) Va, Vb, Vc, and Vd to be applied to the base of the IGBTs 18a, 18b, 18c, and 18d in the inverter circuit 16, and applies the control signals Va, Vb, Vc, and Vd to the IGBTs 18a, 18b, 18c, and 18d in the inverter circuit 16. At the same time, the synchronous circuit 15 set to the first operation mode transmits the generated standard signal SYNC to the external power supply board 10. On the other hand, upon being set to the second operation mode, the synchronous circuit 15 receives the standard signal SYNC transmitted from the external synchronous circuit 15 set to the first operation mode as a reference signal REF, adjusts the phase of the standard signal SYNC generated therein in the same manner as described above by comparing the phase of the standard signal SYNC with the phase of the reference signal REF. Then, the synchronous circuit 15 generates the control signals (clock signals) Va, Vb, Vc, and Vd on the basis of the standard signal SYNC the phase of which is adjusted, and applies the generated control signals Va, Vb, Vc, and Vd to the IGBTs 18a, 18b, 18c, and 18d in the inverter circuit 16. At the same time, the synchronous circuit 15 set to the second operation mode transmits the standard signal SYNC the phase of which is adjusted, to the external power supply board 10.

In the contactless power feeding system 100 according to the present example embodiment, the synchronous circuit 15 of a one power supply board among the power supply boards 10 is set to the first operation mode in advance, and the synchronous circuit 15 of the remaining power supply boards excluding the one power supply board among the power supply boards 10, is set to the second operation mode in advance. Then, the synchronous circuits 15 of the power supply boards 10 are configured to mutually transmit and receive the standard signal SYNC used to drive the inverter circuit 16.

The power distribution circuit 11 includes a plurality of resonance circuits 19 the number of which corresponds to the number of the power supply lines 12, and a connection circuit 20 for electrically connecting the resonance circuit 19 to the power supply boards 10. The connection circuit 20 is configured to connect respective pairs of input terminals of the resonance circuits 19 to the respective pairs of output terminals 13 of the power supply boards 10 in an alternating manner in parallel via capacitors 22. Each of the resonance circuits 19 includes a pair of input terminals 21 and a pair of output terminals 23 connected to each of the power supply lines 12, and generates AC power by causing the AC voltage applied to the pair of input terminals to resonate, and outputs the generated AC power to each of the power supply lines 12. With the power distribution circuit 11 of such a configuration, the AC power generated by each of the power supply boards 10 is distributed to the power supply lines 12, and the distributed AC power is combined for each of the power supply lines 12 and is supplied toward each of the power supply lines 12.

Figure 4:
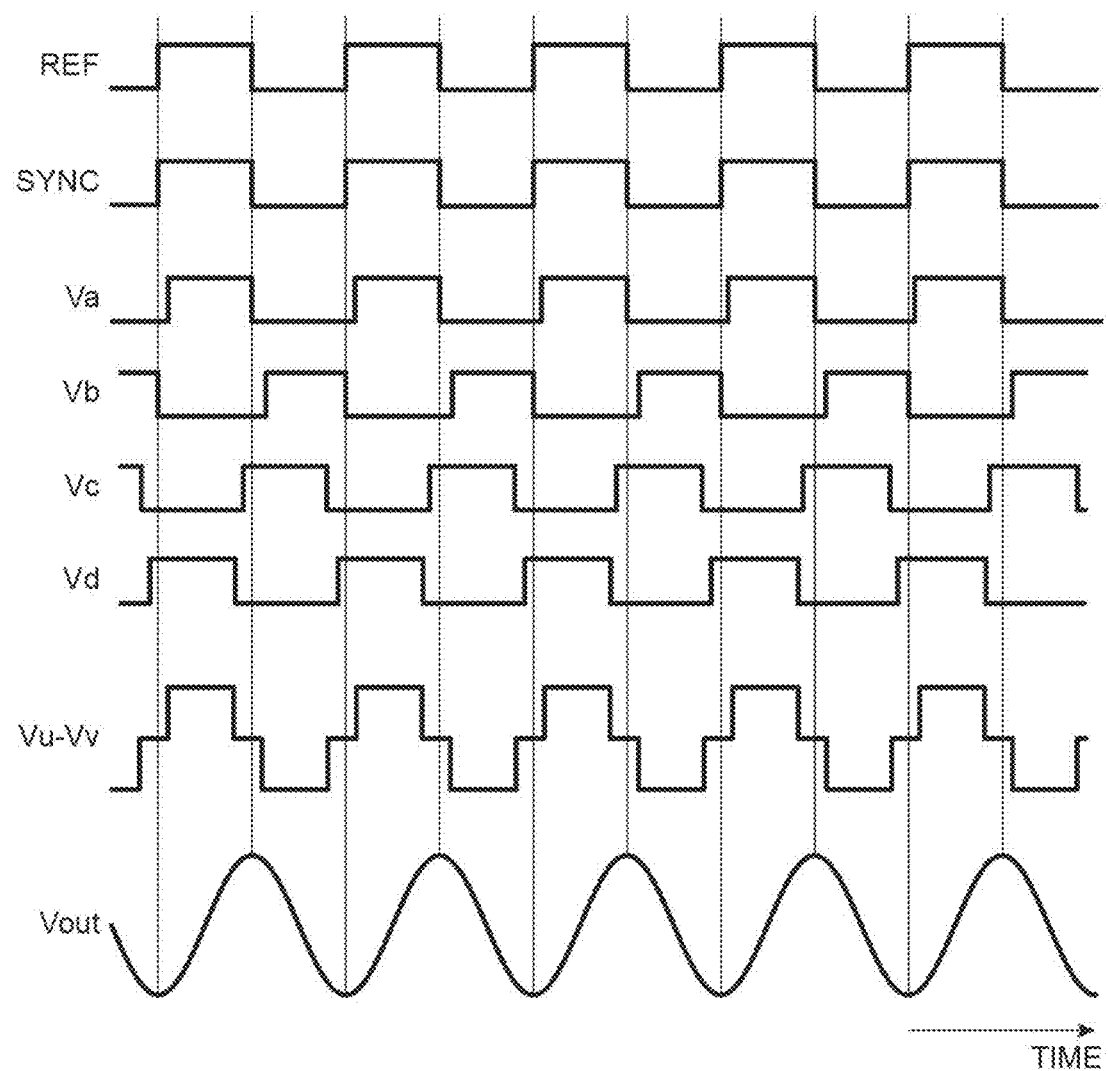
FIG. 4 is a diagram illustrating an example of waveforms of various signals generated by a power supply board.

Next, an example of waveforms of various s signals generated by the power supply board 10 will be illustrated. FIG. 4 illustrates an example of waveforms when the power supply board 10 is set to the second operation mode.

The power supply board 10 set to the second operation mode performs a phase comparison between the reference signal REF received from the external power supply board 10 set to the first operation mode and the standard signal SYNC generated therein, and adjusts the phase of the standard signal SYNC on the basis of the comparison results. Then, the power supply board 10 set to the second operation mode generates four control signals Va, Vb, Vc, and Vd to synchronize with the standard signal SYNC the phase of which is adjusted. Then, by driving the inverter circuit 16 on the basis of the control signals Va, Vb, Vc, and Vd, the power supply board 10 causes the inverter circuit 16 to output AC voltage Vu-Vv. The AC voltage Vu-Vv output from the power supply board 10 is converted into an AC voltage VOUT with an AC waveform that changes smoothly, by passing through the power distribution circuit 11. The AC voltage VOUT is then supplied to the power supply line 12.

To prevent a flow-through current from occurring in the inverter circuit 16, the power supply board 10 generates the four control signals Va, Vb, Vc, and Vd such that the control signals Va and Vd and the control signals Vb and Vc alternately become high level by synchronizing with the standard signal SYNC, while providing a pause period between the ON period of the control signal Va and the ON period of the control signal Vb, and between the ON period of the control signal Vc and the ON period of the control signal Vd. In this process, to reduce or prevent a back electromotive force of an inductor on the output side of the inverter circuit 16, the power supply board 10 generates the four control signals Va, Vb, Vc, and Vd to provide an overlapping period during which the control signal Va and the control signal Vc are turned ON at the same time, and an overlapping period during which the control signal Vb and the control signal Vd are turned ON at the same time.

Figure 5:
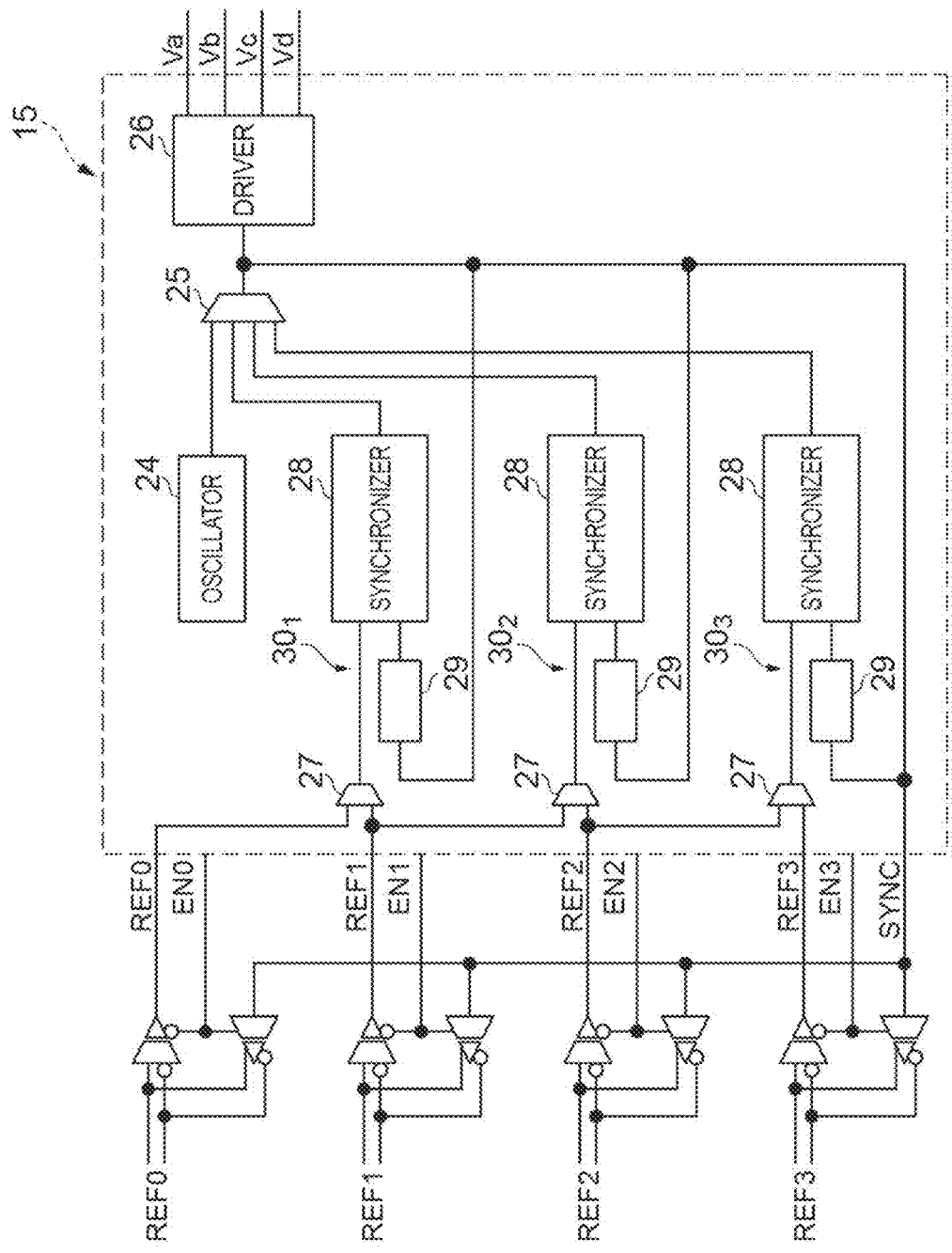
FIG. 5 is a block diagram illustrating a detailed functional configuration of a synchronous circuit.
Figure 6:
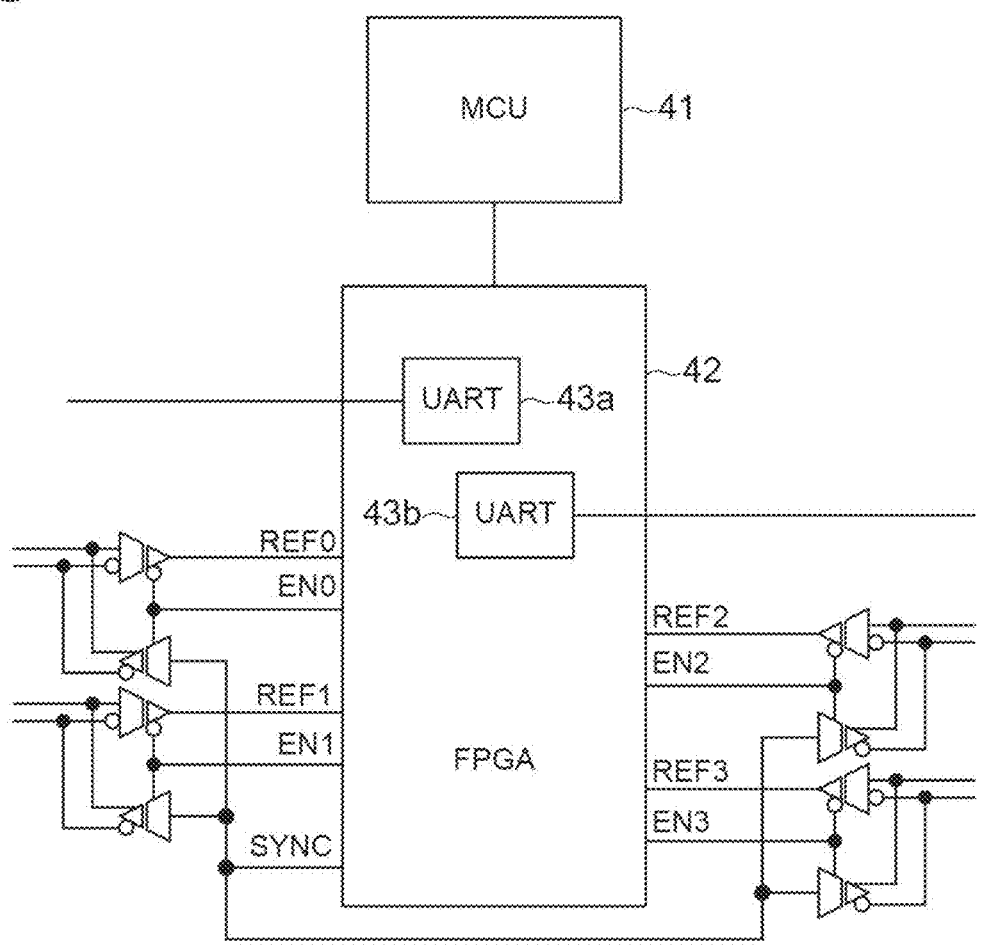
FIG. 6 is a block diagram illustrating a hardware configuration for implementing the synchronous circuit.
Figure 7:
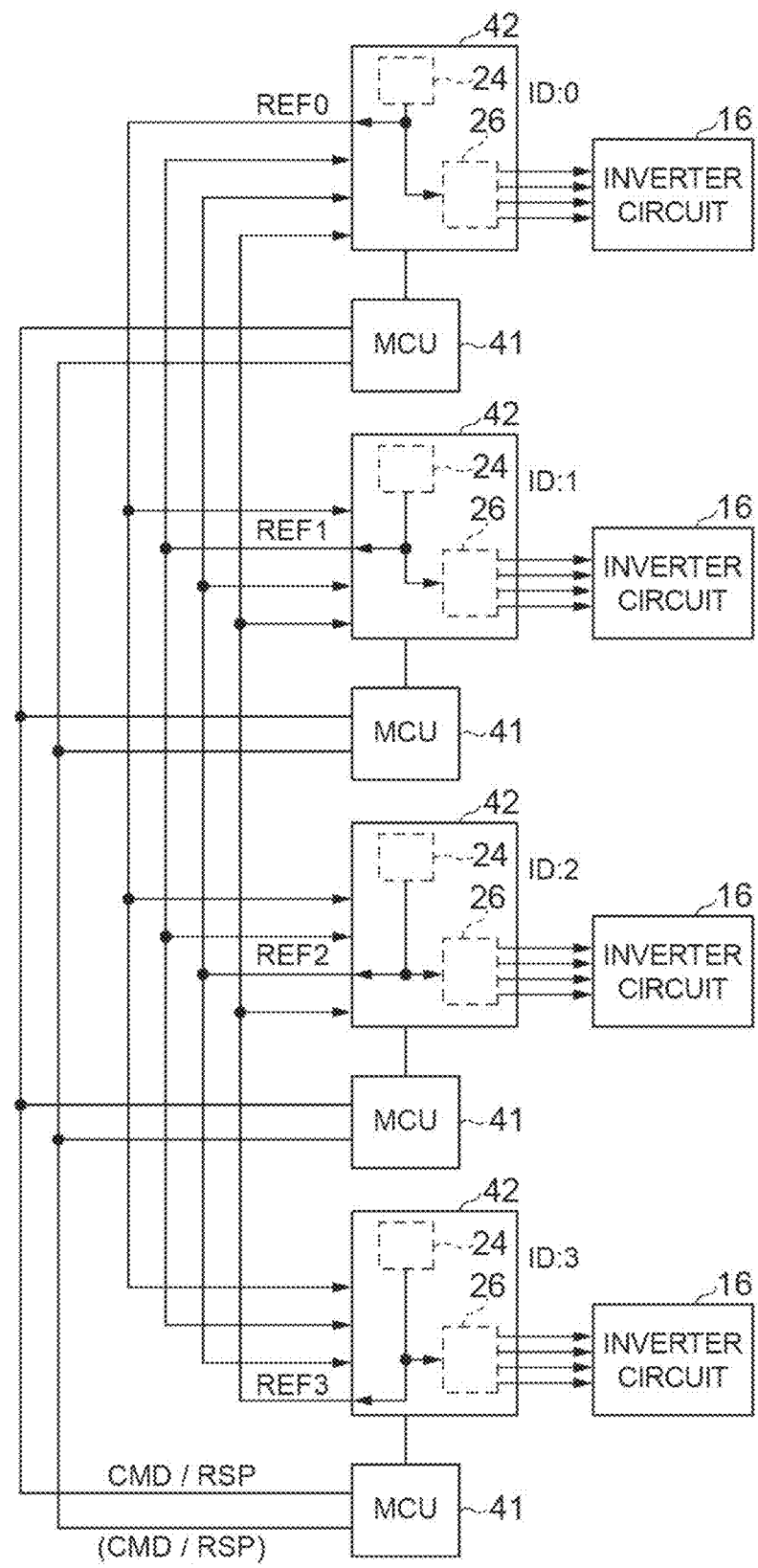
FIG. 7 is a diagram illustrating a connection configuration between synchronous circuits of a plurality of power supply boards.

Next, with reference to FIG. 5 to FIG. 7, the details of the configuration of the synchronous circuit 15 of the power supply board 10 will be described. FIG. 5 is a block diagram illustrating a detailed functional configuration of the synchronous circuit 15. FIG. 6 is a block diagram illustrating a hardware configuration for implementing the synchronous circuit 15. FIG. 7 is a diagram illustrating a connection configuration between the synchronous circuits 15 of the power supply boards 10. FIGS. 5 to 7 illustrate configuration examples when the number of the power supply boards 10 of the contactless power feeding system 100 is four, for example.

As illustrated in FIG. 5, as functional components, the synchronous circuit 15 includes an oscillator 24, a selector 25, a driver 26, and three synchronization signal generation units $30_1$, $30_2$, and $30_3$ including a selector 27, a synchronizer 28, and a variable delay element 29. The synchronous circuit 15 is provided with the synchronization signal generation units $30_1$, $30_2$, and $30_3$, the number obtained by subtracting one from the total number of the power supply boards 10. In this example, one of four identifier IDs "0", "1", "2", and "3" is distributed and set in advance to each of the synchronous circuits 15 in the four power supply boards 10. The synchronous circuit 15 set with the identifier ID "0" is configured to operate in the first operation mode, and the synchronous circuit 15 set with any one of the identifier IDs "1", "2", and "3" is configured to operate in the second operation mode. Moreover, each of the synchronous circuits 15 in the four power supply boards 10 is connected to the synchronous circuits 15 of the other three power supply boards 10 by a communication line in a communicable manner. The synchronous circuits 15 are configured to be able to mutually transmit and receive the standard signal SYNC generated by the synchronous circuits 15 of the four power supply boards 10. In the following explanation, the standard signal SYNC transmitted from the power supply board 10 to which the identifier ID "0" is set in advance is referred to as a reference signal REF0, the standard signal SYNC transmitted from the power supply board 10 to which the identifier ID "1" is set in advance is referred to as a reference signal REF1, the standard signal SYNC transmitted from the power supply board 10 to which the identifier ID "2" is set in advance is referred to as a reference signal REF2, and the standard signal SYNC transmitted from the power supply board 10 to which the identifier ID "3" is set in advance is referred to as a reference signal REF3.

A crystal oscillator, a PLL, a frequency divider, and the like are built into the oscillator 24. The oscillator 24 generates the standard signal SYNC, that is, a clock signal, by frequency-dividing the operation clock generated by the crystal oscillator. For example, the operation clock is set to about 20 MHz, and the standard signal SYNC is set to about 8.9 kHz, for example.

The functions of the selector 27, the synchronizer 28, and the variable delay element 29 of the synchronization signal generation units $30_1$, $30_2$, and $30_3$ will be described. The selector 27 selects one of the two reference signals REF transmitted from two of the other three power supply boards 10, and inputs the selected reference signal REF to the synchronizer 28. The variable delay element 29 receives the standard signal SYNC generated by the oscillator 24 or the standard signal SYNC the phase of which is adjusted by the synchronizer 28, samples the received standard signal SYNC therein, causes the sampled standard signal SYNC to delay by the delay time corresponding to the transmission delay of the reference signal REF selected by the selector 27, and inputs the delayed standard signal SYNC to the synchronizer 28. The synchronizer 28 compares the phase of the reference signal REF selected by the selector 27 with the phase of the standard signal SYNC input from the variable delay element 29. If the phase delay of the standard signal SYNC is detected, the synchronizer 28 adjusts the standard signal SYNC such that the cycle of the standard signal SYNC generated by the oscillator 24 is gradually shortened (varied). On contrary, if the phase advance of the standard signal SYNC is detected by phase comparison, the synchronizer 28 adjusts the standard signal SYNC such that the cycle of the standard signal SYNC generated by the oscillator 24 is gradually extended (varied). In this process, delay occurs in a phase adjustment process of the standard signal SYNC. Hence, a conflict may occur between the detection of phase delay and the detection of phase advance. In this case, the synchronizer 28 does not perform the phase adjustment process. Moreover, the synchronizer 28 performs the adjustment process only when a phase difference within a predetermined range is detected. When a phase difference exceeding the predetermined range is detected, or when the transition of the level of reference signal REF cannot be detected within one cycle of the standard signal SYNC, the synchronizer 28 detects that a loss of synchronization (synchronization abnormality) of the reference signal REF has occurred.

The three synchronization signal generation units $30_1$, $30_2$, and $30_3$ operate the selector 27 to select one signal from the three reference signals REF received from the external power supply board 10 among the four reference signals REF0 to REF3. Moreover, when the synchronous circuit 15 is set to the first operation mode, the synchronizer 28 of the three synchronization signal generation units $30_1$, $30_2$, and $30_3$ only detects the loss of synchronization of the reference signal REF generated by the external synchronous circuit 15 with respect to the standard signal SYNC. On the other hand, when the synchronous circuit 15 is set to the second operation mode, the synchronizer 28 to which the reference signal REF from the external synchronous circuit 15 operating in the first operation mode is selectively input, performs phase comparison and phase adjustment on the standard signal SYNC as described above, and the other two synchronizers 28 only detect the loss of synchronization of the reference signal REF with respect to the standard signal SYNC.

The selector 25 selects one signal from the standard signal SYNC generated by the oscillator 24 and the standard signals SYNC adjusted by the three synchronizers 28, and inputs the selected standard signal SYNC to the driver 26. That is, when the synchronous circuit 15 is set to the first operation mode, the selector 25 selects the standard signal SYNC from the oscillator 24. On the other hand, when the synchronous circuit 15 is set to the second operation mode, the selector 25 selects the standard signal SYNC from the synchronizer 28 that performs phase adjustment on the standard signal SYNC among the three synchronizers 28.

Upon receiving the standard signal SYNC selectively output by the selector 25, the driver 26 generates the control signals Va, Vb, Vc, and Vd to drive the inverter circuit 16 to synchronize with the standard signal SYNC, and applies the control signals Va, Vb, Vc, and Vd to the inverter circuit 16. According to such a configuration, it is possible to drive the inverter circuit 16 such that the phases of the AC powers output to the respective power supply lines 12 from the inverter circuits 16 of the four power supply boards 10 match with each other.

As illustrated in FIG. 5, the synchronous circuit 15 includes signal ports for four reference signals REF0 to REF3. In the synchronous circuit 15, by validating any one of setting signals EN0 to EN3 according to the identifier ID set to the power supply board 10, only one of the signals ports for the four reference signals REF0 to REF3 is switched to the output port for the standard signal SYNC, and the other ports are set as the input ports for the reference signal REF from the external power supply board 10. Consequently, the standard signal SYNC is output to the one signal port selected from the four signal ports.

As illustrated in FIG. 6, the synchronous circuit 15 is implemented by a Micro Controller Unit (MCU) 41 that is a computer system built on an integrated circuit, and a Field Programmable Gate Array (FPGA) 42 that is a device in which programmable gates are integrated. The FPGA 42 contains Universal Asynchronous Receiver/Transmitters (UARTs) 43$a$ and 43$b$ that are communication devices configured to implement the communication between the power supply boards 10 using the asynchronous half-duplex communication method. The UARTs 43$a$ and 43$b$ have a duplex structure with a communication line and a connector configured to connect the power supply boards 10. In the FPGA 42, the circuit units illustrated in FIG. 5 are built. If the MCU 41 has sufficient processing power, the function of the synchronous circuit 15 may be functionally provided by the MCU 41. Moreover, the UARTs 43$a$ and 43$b$ may be built into the MCU 41.

With reference to FIG. 7, the connection configuration between the synchronous circuits 15 in the four power supply boards 10 of the contactless power feeding system 100 will be described. The synchronous circuit 15 in the four power supply boards 10 is configured to be able to transmit and receive the standard signal SYNC, a command signal CMD, and a response signal RSP via a transmission line used for inter-board communication. In this example, the transmission line used for inter-board communication is duplexed with a communication device, a communication line, and a connector. That is, the FPGA 42 of one of the power supply boards 10 to which the identifier ID "0" is set in advance, transmits the standard signal SYNC generated by the internal oscillator 24 as the reference signal REF0, to the FPGAs 42 of the other three power supply boards 10. On the other hand, the FPGAs 42 of the three power supply boards 10 to which the identifier IDs "1", "2", and "3" are set in advance, each transmit the standard signal the phase of which is adjusted on the basis of the reference signal REF0, to the FPGAs 42 of the other three power supply boards 10 as the reference signals REF1, REF2, and REF3. The MCUs 41 of the four power supply boards 10 mutually transmit and receive the command signal CMD and the response signal RSP, by specifying the identifier ID of the power supply board 10 of the transmission destination.

Figure 8:
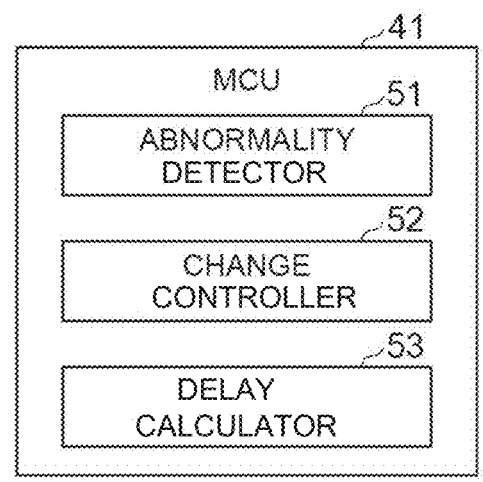
FIG. 8 is a block diagram illustrating a functional configuration of an MCU in the synchronous circuit.

With reference to FIG. 8, the functional configuration of the MCU 41 in the synchronous circuit 15 will be described. As functional components, the MCU 41 includes an abnormality detector 51, a change controller 52, and a delay calculator 53.

The abnormality detector 51 determines an abnormality of each of the power supply boards 10 on the basis of the conditions of the standard signal SYNC generated by the power supply board 10 and the reference signal REF received from another power supply board 10 except the power supply board 10. For example, if the synchronous circuit 15 detects a synchronization abnormality of the reference signal REF, the abnormality detector 51 determines that a synchronization abnormality has occurred in another power supply board 10 corresponding to the reference signal REF. In this case, the abnormality detector 51 exchanges the determination results of a synchronization abnormality relating to the power supply boards 10, with the power supply boards 10 using the command signal CMD and the response signal RSP. Then, the abnormality detector 51 determines the consistency of the determination results among the power supply boards 10, and specifies whether there is a failure in each of the power supply boards 10 on the basis of the determination results. For example, the abnormality detector 51 specifies a failure in the circuit or the transmission line of a certain power supply board 10 on the basis of a mismatch with the determination results of a synchronization abnormality of the other power supply boards 10. Moreover, when the power supply boards 10 simultaneously determine that there is a synchronization abnormality in the power supply board 10, the abnormality detector 51 specifies that there is a failure in the circuit or the transmission line of the power supply board 10.

Moreover, the abnormality detector 51 is operable to determine an abnormality of the power supply boards 10 on the basis of the communication conditions of the command signal CMD and the response signal RSP transmitted and received to and from the power supply boards 10 as heartbeat commands. Specifically, the abnormality detector 51 of the synchronous circuit 15 set to the first operation mode, periodically transmits the command signal CMD to another power supply board 10, and the abnormality detector 51 of the synchronous circuit 15 in the other power supply board 10 sends back the response signal RSP in response. Then, the abnormality detector 51 of the synchronous circuit 15 set to the first operation mode specifies an abnormality of the other power supply board 10 set to the second operation mode on the basis of the reception condition of the response signal RSP. In this process, the abnormality detector 51 may also specify an abnormality of the power supply boards 10 including the power supply board 10, in combination with the determination results of the synchronization abnormality of the power supply board 10 described above.

Moreover, the abnormality detector 51 is operable to determine a failure of the inverter circuit 16 in the power supply board 10, by monitoring the output current of the inverter circuit 16.

The change controller 52 is configured or programmed to change the operation mode of the power supply boards 10 on the basis of the abnormality specification results by the abnormality detector 51. Specifically, when an abnormality of the power supply board 10 is determined, and when the power supply board 10 is set to the first operation mode, the change controller 52 stops outputting the standard signal SYNC and the reference signal REF, and stops supplying AC power. The change controller 52 then transmits, to another power supply board 10, the command signal CMD to change one of the other power supply boards 10 to the first operation mode, by broadcasting. Upon receiving the command signal CMD, the change controller 52 of the other power supply board 10 controls to change the synchronization process to the first operation mode, or to change the reference signal REF of the synchronization destination in the second operation mode. Moreover, when an abnormality of the power supply board 10 is determined, and when the power supply board 10 is set to the second operation mode, the change controller 52 stops outputting the standard signal SYNC and the reference signal REF, and stops supplying AC power.

Furthermore, when an abnormality of the other power supply board 10 is determined, the other power supply board 10 is set to the first operation mode, and the power supply board 10 should be set to the first operation mode next, the change controller 52 transmits the command signal CMD to change the operation mode to the other power supply board 10 by broadcasting, and controls to change the power supply board 10 to the first operation mode. Upon receiving the command signal CMD, the other power supply board 10 controls to change the synchronization destination in the second operation mode, and the power supply board 10 that has been operating in the first operation mode stops supplying power. Still furthermore, when an abnormality of the other power supply board 10 is determined, and the concerned power supply board 10 is set to the second operation mode, the change controller 52 transmits the command signal CMD to provide a notification of a detection of abnormality, to that power supply board 10. Upon receiving the command signal CMD, the power supply board 10 stops outputting the standard signal SYNC and the reference signal REF, and stops supplying AC power.

The delay calculator 53 measures the transmission delay of the standard signal SYNC between the power supply boards 10, and on the basis of the measured results, sets the delay time by a plurality of the variable delay elements 29 in the synchronous circuit 15 to be variable. Specifically, as an initialization process at the time of starting the contactless power feeding system 100, the delay calculator 53 transmits the reference signal REF from the power supply board 10 to another power supply board 10, measures the delay time of the reference signal REF sent back from the other power supply board 10, and calculates the half value of the delay time as the transmission delay time (latency) between the power supply board 10 and the other power supply board 10. The delay calculator 53 repeats such measurement to calculate the latency between the power supply board 10 and the other power supply board 10, and on the basis of the latency value (calibration value), sets the delay time of the variable delay element 29 used for phase comparison of the reference signals REF from the respective other power supply boards 10. Each of the delay calculators 53 of the power supply boards 10 performs the setting process of the delay time described above at the initialization process.

Figure 9:
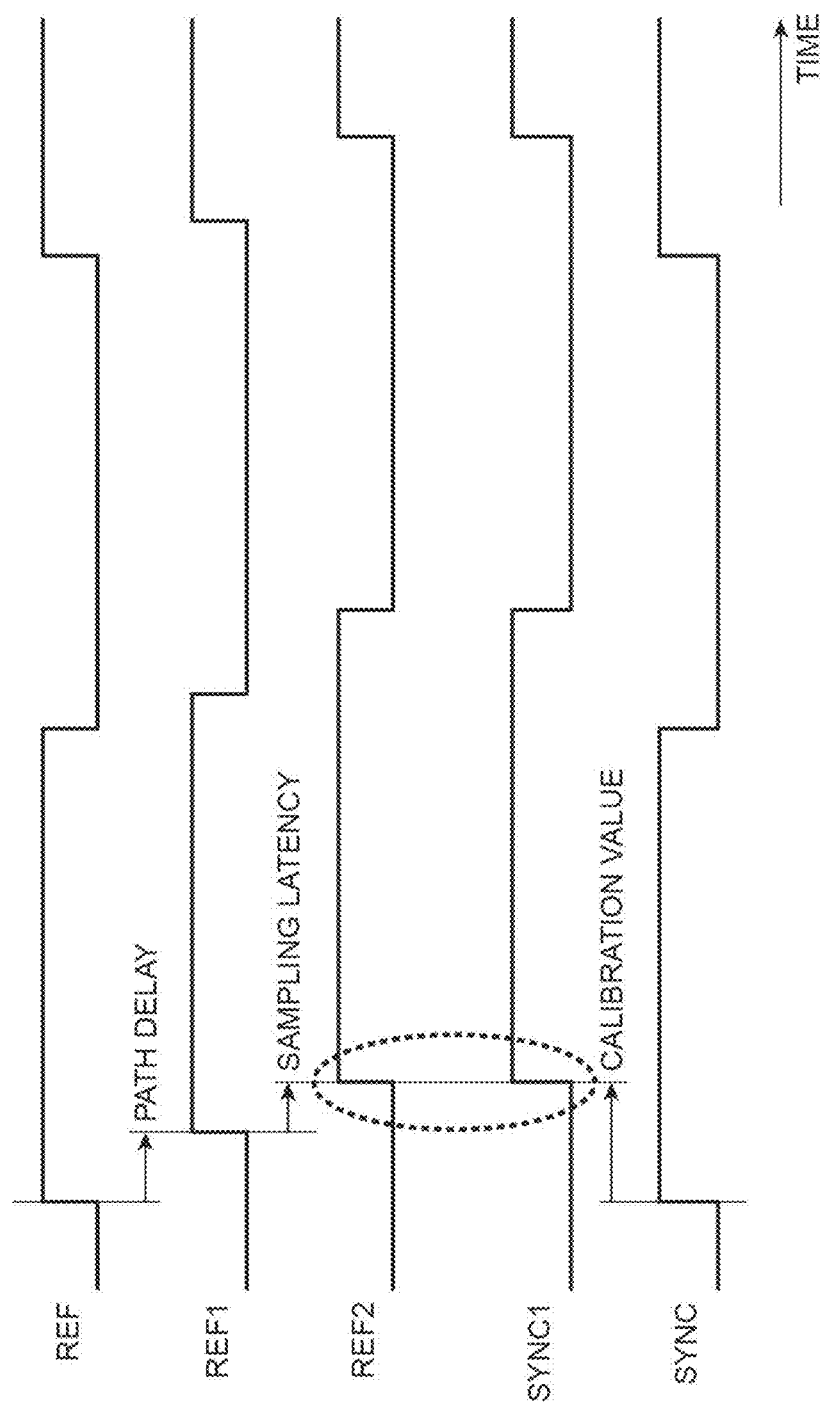
FIG. 9 is a timing chart for explaining the operation of phase comparison in the synchronous circuit of the power supply board.

FIG. 9 is a timing chart for explaining the operation of phase comparison in the synchronous circuit 15 of the power supply board 10. Thus, in the synchronous circuit 15 of the power supply board 10, the reference signal REF2 that is delayed from the signal REF1 having delayed from the reference signal REF by the path delay including the propagation delay in the transceiver IC built into the power supply boards 10 and the transmission delay in the transmission line used for inter-board communication, by sampling latency in the synchronous circuit 15, is received from the other power supply board 10. After adjusting the standard signal SYNC generated therein or the phase of which is adjusted, to a standard signal SYNC1 by delaying the standard signal SYNC by a time corresponding to the calibration value calculated by the delay calculator 53, the synchronous circuit 15 can perform a phase comparison between the standard signal SYNC1 and the reference signal REF2.

Figure 10A:
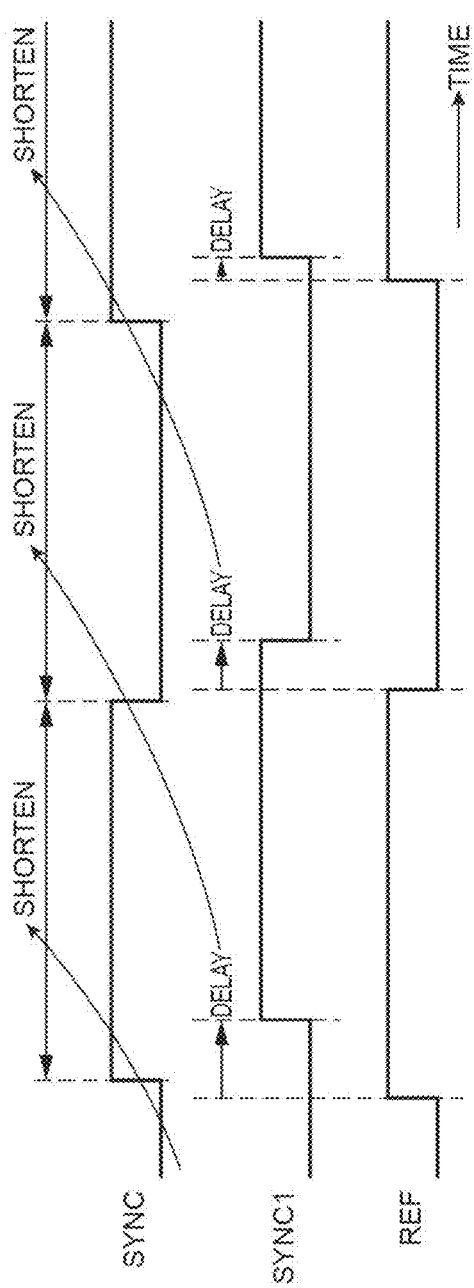
FIGS. 10A and 10B are timing charts for explaining the operation of phase adjustment of a standard signal SYNC in the synchronous circuit of the power supply board.
Figure 10B:
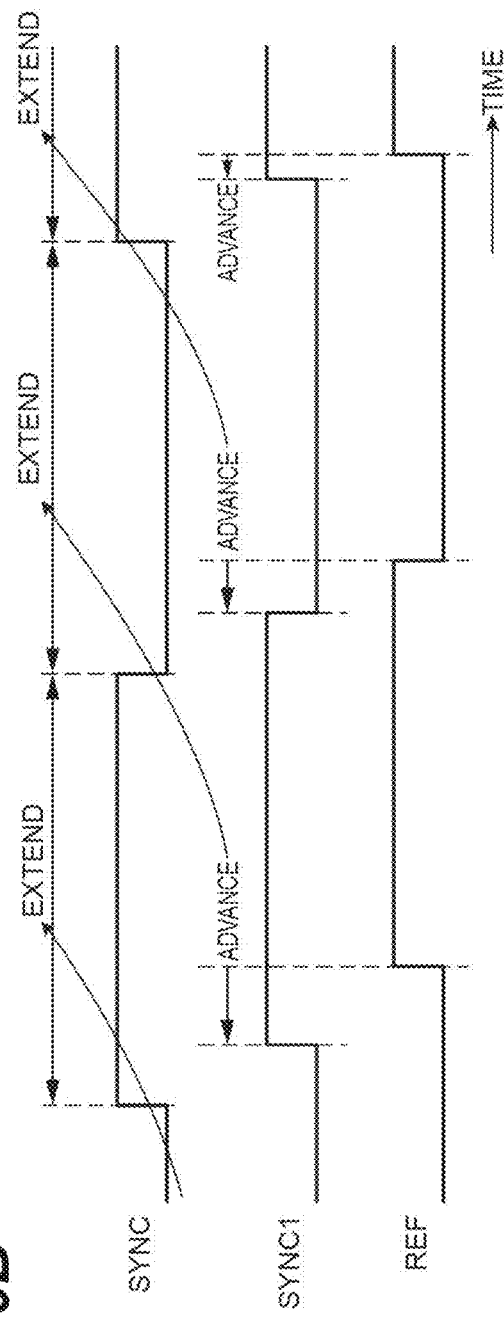

FIGS. 10A and 10B are timing chart for explaining the operation of phase adjustment of the standard signal SYNC in the synchronous circuit 15 of the power supply board 10 operating in the second operation mode. FIG. 10A is a timing chart when the delay of the standard signal SYNC1 is detected. FIG. 10B is a timing chart when the advance of the standard signal SYNC1 is detected. Thus, when the phase delay of the standard signal SYNC1 to which the delay time is added with respect to the reference signal REF from the power supply board 10 operating in the first mode is detected, the synchronous circuit 15 controls the oscillator 24 such that the cycle of the standard signal SYNC is gradually shortened. On the other hand, when the phase advance of the standard signal SYNC1 to which the delay time is added with respect to the reference signal REF from the power supply board 10 operating in the first operation mode is detected, the synchronous circuit 15 controls the oscillator 24 such that the cycle of the standard signal SYNC is gradually extended. Consequently, the synchronous circuit 15 can adjust the phase of the standard signal SYNC such that the phase of the standard signal SYNC matches the phase of the reference signal REF prior to the occurrence of a path delay.

Next, the procedure of a contactless power feeding method using the contactless power feeding system 100 according to the present example embodiment will be described.

Upon activation of the power supply board 10 that is any one of the power supply boards 10 of the contactless power feeding system 100, the command signal CMD to instruct activation is transmitted from the power supply board 10 to another power supply board 10. Consequently, a synchronous processing mode is set in the synchronous circuit 15 in each of the power supply boards 10.

Then, the synchronous circuit 15 of the one power supply board 10 set to the first operation mode among the power supply boards 10 drives the inverter circuit 16 of the one power supply board 10 on the basis of the standard signal SYNC generated by the internal oscillator 24. Then, the one power supply board 10 starts supplying AC power to the power supply lines 12. At the same time, the standard signal SYNC is transmitted as the reference signal REF, from the synchronous circuit 15 of the one power supply board 10 set to the first operation mode, to the remaining power supply boards 10 other than the one power supply board 10.

In contrast, the synchronous circuit 15 of the remaining power supply boards 10 other than the one power supply board 10 performs a phase comparison between the standard signal SYNC generated by the internal oscillator 24 and the reference signal REF transmitted from the one power supply board 10, to adjust the phase of the standard signal SYNC. Then, the synchronous circuit 15 of the remaining power supply boards 10 drives the inverter circuit 16 of the remaining power supply boards 10 on the basis of the standard signal SYNC the phase of which is adjusted, and the remaining power supply boards 10 start supplying AC power to the power supply lines 12.

The advantageous effects obtained by the contactless power feeding system 100 of the present example embodiment described above, and the contactless power feeding method using the contactless power feeding system 100 will now be described.

According to the present example embodiment, the AC power generated by the power supply boards 10 is distributed and supplied to the power supply lines 12. Hence, it is possible to supply power to the mobile body 130 from the power supply lines 12 in a contactless manner. Consequently, even if the power supply from the power supply board 10 is stopped due to a failure or the like, it is possible to supply power to the mobile body 130 from the remaining power supply boards 10 other than the power supply board 10 via the power supply lines 12. Hence, it is possible to stably supply power to the mobile body 130.

In the present example embodiment, in the one power supply board 10 set to the first operation mode in advance, AC power is generated on the basis of the standard signal SYNC generated therein, and in the remaining power supply boards 10 set to the second operation mode in advance, AC power the phase of which matches that of the AC power generated by the one power supply board 10 is generated on the basis of the standard signal SYNC generated therein and the reference signal REF generated by the one power supply board 10. Consequently, it is possible to align the phases of the AC powers supplied to the power supply lines 12 from the power supply boards 10, and efficiently supply power to the mobile body 130 from the power supply boards 10.

Moreover, in the present example embodiment, the remaining power supply boards 10 drive the inverter circuit 16 by changing the cycle of the standard signal SYNC on the basis of the comparison results of the phases of the reference signal REF received from the one power supply board 10 and the standard signal SYNC generated therein. According to such a configuration, it is possible to efficiently adjust the phase of the standard signal SYNC of the remaining power supply boards 10, and efficiently perform the process of adjusting the phase of the AC power generated by the remaining power supply boards 10 with respect to the phase of the AC power generated by the one power supply board 10.

Furthermore, in the present example embodiment, the power supply boards 10 are configured to be able to mutually transmit and receive the standard signal SYNC generated therein, and each of the power supply boards 10 is configured to determine an abnormality of another power supply board 10 on the basis of the standard signal SYNC received from the other power supply board 10 except the power supply board 10. In this case, the power supply boards 10 can efficiently detect the abnormality of the other power supply board 10.

Still furthermore, in the present example embodiment, when an abnormality of the one power supply board 10 set to the first operation mode is determined, the power supply boards 10 operate to change the power supply board 10 set to the first operation mode. According to such a configuration, it is possible to stably perform the process of adjusting the phase of AC power among the power supply boards 10, and stably supply power to the mobile body 130 without fail.

Still furthermore, in the present example embodiment, the power supply boards 10 operate to determine an abnormality on the basis of at least one of the conditions of the reference signal REF and the communication conditions with another power supply board 10. In this case, it is possible to efficiently determine the abnormality of the other power supply board 10.

Still furthermore, in the present example embodiment, the power supply boards 10 are operable to measure the transmission delay of the reference signal REF between the power supply board 10 and another power supply board 10, and operable to set the calibration value to control the phase of AC power on the basis of the transmission delay. Such a configuration allows to adjust the phase of AC power while taking into account the transmission delay among the power supply boards 10, and to more stably supply power to the mobile body 130.

Still furthermore, in the present example embodiment, on the basis of the comparison results between the phase of the reference signal REF and the phase of the standard signal SYNC delayed according to the calibration value, the power supply boards 10 drive the inverter circuit 16 such that the phases of the AC powers match with each other. In this case, by comparing the phases of the standard signal SYNC while taking into account the transmission delay among the power supply boards 10, it is possible to adjust the phase of AC power in a more significant manner.

While the principles of the present disclosure have been illustrated and described in the example embodiments, it will be appreciated by those skilled in the art that the present disclosure can be modified in arrangement and detail without departing from such principles. The present disclosure is not limited to the specific configurations disclosed in the present example embodiments. We therefore claim all modifications and changes that come within the scope and spirit of the following claims.

In the contactless power feeding apparatuses according to the example embodiments described above, it is preferable that the power supply boards each include an inverter circuit, and cause the inverter circuit to generate AC power; the one power supply board that is any one of the power supply boards is set to the first operation mode in advance, and the remaining power supply boards excluding the one power supply board among the power supply boards are set to the second operation mode in advance; based on a clock signal generated therein, the one power supply board operates to drive the inverter circuit of the one power supply board and to transmit the clock signal as a standard signal to the remaining power supply boards; and, based on a clock signal generated therein and the standard signal received from the one power supply board, the remaining power supply boards operate to drive the inverter circuit such that the phase of the AC power output from the one power supply board matches the phase of the AC power output from the remaining power supply boards.

In this case, in the one power supply board set to the first operation in advance, the AC power is generated on the basis of the clock signal, and in the remaining power supply boards set to the second operation mode in advance, the AC power the phase of which matches that of the AC power generated by the one power supply board is generated on the basis of the clock signal and the clock signal in the one power supply board. Consequently, it is possible to align the phases of the AC power supplied to the power supply lines from the power supply boards, and efficiently supply power to the mobile body from the power supply boards.

Moreover, in the contactless power feeding apparatuses according to the example embodiments described above, it is preferable that the remaining power supply boards drive the inverter circuit such that the phases of the AC power match with each other by changing the cycle of the clock signal on the basis of the comparison results of the phases of the standard signal received from the one power supply board and the clock signal generated therein. According to such a configuration, it is possible to efficiently adjust the phase of the clock signal in the remaining power supply boards, and efficiently perform the process of adjusting the phase of the AC power generated by the remaining power supply boards, with respect to the phase of the AC power generated by the one power supply board.

Furthermore, in the contactless power feeding apparatuses according to the example embodiments described above, it is preferable that the power supply boards are configured to be able to mutually transmit and receive the clock signal generated therein as a standard signal, and that each of the power supply boards includes the abnormality detector configured to determine, on the basis of the standard signal received from another power supply board except the one power supply board, an abnormality of the other power supply board. In this case, the power supply boards can efficiently detect the abnormality of the other power supply board.

Still furthermore, in the contactless power feeding apparatuses according to the example embodiments described above, it is preferable that the power supply boards further include the change controller configured or programmed to change the power supply board set to the first operation mode when the abnormality detector determines an abnormality of the one power supply board. According to such a configuration, it is possible to stably perform the process of adjusting the phase of AC power among the power supply boards, and stably supply power to the mobile body without fail.

Still furthermore, in the contactless power feeding apparatuses according to the example embodiments described above, it is preferable that the abnormality detector determines an abnormality on the basis of at least one of the conditions of the standard signal and the communication conditions with the other power supply board. In this case, it is possible to efficiently determine the abnormality of the other power supply board.

Still furthermore, in the contactless power feeding apparatuses according to the example embodiments described above, it is preferable that the power supply boards include the delay calculator configured to measure the transmission delay of the standard signal between the one power supply board and another power supply board, and set the calibration value to control the phase of the AC power on the basis of the transmission delay. Such a configuration allows to adjust the phase of AC power while taking into account the transmission delay among the power supply boards, and to further stably supply power to the mobile body.

Still furthermore, in the contactless power feeding apparatuses according to the example embodiments described above, it is preferable that, on the basis of the comparison results between the phase of the standard signal and the phase of the clock signal delayed according to the calibration value, the power supply boards drive the inverter circuit such that the phases of the AC power match with each other. In this case, by comparing the phases of the clock signal while taking into account the transmission delay among the power supply boards, it is possible to adjust the phase of AC power in a more significant manner.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A contactless power feeding apparatus, comprising:
a plurality of power supply lines to supply power in a contactless manner to a power receiver provided on a mobile body;
a plurality of power supply boards to generate power; and
a power distribution circuit to distribute and supply the generated power by the plurality of power supply boards to the plurality of power supply lines, wherein
each of the plurality of power supply boards includes an inverter circuit and is operable to cause the inverter circuit to generate AC power;
one of the plurality of power supply boards is set to a first operation mode in advance, and remaining ones of the plurality of power supply boards excluding the one of the plurality of power supply boards are set to a second operation mode in advance;
based on a first clock signal generated in the one of the plurality of power supply boards, the one of the plurality of power supply boards is operable to drive the inverter circuit of the one of the plurality of power supply boards and to transmit the first clock signal as a standard signal to the remaining ones of the plurality of power supply boards; and
based on a second clock signal generated in the remaining ones of the plurality of power supply boards and the standard signal received from the one of the plurality of power supply boards, the remaining ones of the plurality of power supply boards are operable to drive the inverter circuit of the remaining ones of the plurality of power supply boards such that a first phase of the AC power output from the one of the plurality of power supply boards matches a second phase of the AC power output from the remaining ones of the plurality of power supply boards.

2. The contactless power feeding apparatus according to claim 1, wherein the remaining ones of the plurality of power supply boards are operable to drive the inverter circuit such that the first and second phases of the AC power match with each other by changing a cycle of the second clock signal based on a comparison result between phases of the standard signal received from the one of the plurality of power supply boards and the second clock signal generated therein.

3. The contactless power feeding apparatus according to claim 1, wherein the plurality of power supply boards are operable to mutually transmit and receive the first clock signal as the standard signal; and each of the plurality of power supply boards includes an abnormality detector to determine, based on the standard signal received from another of the plurality of power supply boards, a first abnormality of the another of the plurality of power supply boards.

4. The contactless power feeding apparatus according to claim 3, wherein each of the plurality of power supply boards includes a change controller configured or programmed to change the one of the plurality of power supply boards set to the first operation mode when the abnormality detector determines a second abnormality of the one of the plurality of power supply boards.

5. The contactless power feeding apparatus according to claim 3, wherein the abnormality detector is operable to determine the first abnormality based on at least one of a condition of the standard signal and a communication condition with the another of the plurality of power supply boards.

6. The contactless power feeding apparatus according to claim 1, wherein each of the plurality of power supply boards includes a delay calculator to measure a transmission delay of the standard signal relative to another of the plurality of power supply boards; and each of the plurality of power supply boards is operable to set a calibration value to control the second phase of the AC power based on the transmission delay.

7. The contactless power feeding apparatus according to claim 6, wherein, based on a comparison result between a phase of the standard signal and the second phase of the second clock signal delayed according to the calibration value, each of the plurality of power supply boards is operable to drive the inverter circuit such that the first and second phases of the AC power match with each other.

8. A contactless power feeding method, comprising:
distributing and supplying power generated by a plurality of power supply boards to a plurality of power supply lines via a power distribution circuit; and
supplying the power in a contactless manner to a power receiver provided on a mobile body from the plurality of power supply lines; wherein
each of the plurality of power supply boards includes an inverter circuit and is operable to cause the inverter circuit to generate AC power;
one of the plurality of power supply boards is set to a first operation mode in advance, and remaining ones of the plurality of power supply boards excluding the one of the plurality of power supply boards are set to a second operation mode in advance;
based on a first clock signal generated the one of the plurality of power supply boards, the one of the plurality of power supply boards drives the inverter circuit of the one of the plurality of power supply boards, and transmits the first clock signal as a standard signal to remaining ones of the plurality of power supply boards; and
based on a second clock signal generated in the remaining ones of the plurality of power supply boards and the standard signal received from the one of the plurality of power supply boards, the remaining ones of the plurality of power supply boards drive the inverter circuit of the remaining ones of the plurality of power supply boards such that a first phase of the AC power output from the one of the plurality of power supply boards matches a second phase of the AC power output from the remaining ones of the plurality of power supply boards.

* * * * *